US009004500B2

(12) United States Patent
Murakami et al.

(10) Patent No.: US 9,004,500 B2
(45) Date of Patent: Apr. 14, 2015

(54) VEHICLE HEIGHT CONTROL DEVICE FOR MOTORCYCLE

(71) Applicant: Showa Corporation, Gyoda-shi (JP)

(72) Inventors: Yosuke Murakami, Fukuroi (JP); Tadashi Hachisuka, Fukuroi (JP); Kazuhiro Miwa, Fukuroi (JP)

(73) Assignee: Showa Corporation, Gyoda-Shi (JP)

( * ) Notice: Subject to any disclaimer, the term of this patent is extended or adjusted under 35 U.S.C. 154(b) by 44 days.

(21) Appl. No.: 14/018,830

(22) Filed: Sep. 5, 2013

(65) Prior Publication Data

US 2014/0167371 A1    Jun. 19, 2014

(30) Foreign Application Priority Data

Dec. 14, 2012  (JP) ................................. 2012-274040

(51) Int. Cl.
| | |
|---|---|
| *B60K 25/04* | (2006.01) |
| *B62K 25/04* | (2006.01) |
| *B60G 17/016* | (2006.01) |
| *B60G 17/08* | (2006.01) |
| *B62K 25/08* | (2006.01) |

(52) U.S. Cl.
CPC .............. *B62K 25/04* (2013.01); *B60G 17/016* (2013.01); *B60G 17/08* (2013.01); *B60G 2500/30* (2013.01); *B60G 2400/25* (2013.01); *B62K 25/08* (2013.01)

(58) Field of Classification Search
CPC ............. B62K 25/06; B60G 2500/302; B60G 2400/252; B60G 17/048; B60G 2202/154; B60G 2202/15; B60G 2202/413; B60G 2202/416; B60G 17/044; F16F 9/325

USPC .................. 280/6.157, 5.514; 180/227, 219; 267/64.17; 188/322.2, 315, 322.19, 188/322.21

See application file for complete search history.

(56) References Cited

U.S. PATENT DOCUMENTS

| | | | | |
|---|---|---|---|---|
| 3,799,528 | A | * | 3/1974 | Allinquant et al. ........ 267/64.17 |
| 5,009,451 | A | * | 4/1991 | Hayashi et al. ............ 280/6.157 |
| 5,098,120 | A | | 3/1992 | Hayashi et al. |
| 5,101,923 | A | * | 4/1992 | Odagi et al. .................. 180/219 |
| 5,564,680 | A | * | 10/1996 | Sano et al. ................. 267/64.17 |
| 5,797,594 | A | * | 8/1998 | Sekine et al. .............. 267/64.17 |
| 6,592,136 | B2 | * | 7/2003 | Becker et al. ................. 280/276 |

(Continued)

FOREIGN PATENT DOCUMENTS

| | | |
|---|---|---|
| JP | 61-033783 U | 3/1986 |
| JP | 02-031036 A | 2/1990 |

(Continued)

*Primary Examiner* — James English
(74) *Attorney, Agent, or Firm* — Leason Ellis LLP

(57) ABSTRACT

A vehicle height control device comprises a vehicle height control unit including a jack housing of a hydraulic jack provided at an upper end portion of an inner tube, a suspension spring provided between an upper end of a hollow pipe and a plunger of the hydraulic jack, a pump housing provided at the plunger of the hydraulic jack and forming a pump chamber of a hydraulic pump, and a pump pipe communicating with an oil reservoir chamber on an inner periphery of the hollow pipe and slidably inserted into the pump chamber in the pump housing, and a selector valve controlling the vehicle height by adjusting the amount of hydraulic oil fed to a jack chamber in the hydraulic jack by the hydraulic pump that performs the pumping operation in conjunction with extending and contracting motion of the hollow pipe with respect to the inner tube.

10 Claims, 11 Drawing Sheets

(56) References Cited

U.S. PATENT DOCUMENTS

| | | | |
|---|---|---|---|
| 8,215,620 B2* | 7/2012 | Krauss | 267/64.17 |
| 8,672,106 B2* | 3/2014 | Laird et al. | 188/275 |
| 8,672,334 B1* | 3/2014 | Murakami et al. | 280/5.514 |
| 8,844,944 B1* | 9/2014 | Murakami | 280/5.514 |
| 8,905,409 B2* | 12/2014 | Murakami | 280/5.514 |
| 2001/0032462 A1* | 10/2001 | Beck | 60/477 |
| 2003/0213662 A1* | 11/2003 | Fox | 188/275 |
| 2010/0294605 A1* | 11/2010 | Mochizuki | 188/297 |
| 2013/0048452 A1* | 2/2013 | Nagai et al. | 188/282.1 |
| 2014/0077465 A1* | 3/2014 | Murakami et al. | 280/6.157 |
| 2014/0083093 A1* | 3/2014 | Murakami et al. | 60/459 |
| 2014/0084528 A1* | 3/2014 | Murakami | 267/221 |
| 2014/0084555 A1* | 3/2014 | Murakami | 280/5.514 |
| 2014/0175764 A1* | 6/2014 | Murakami et al. | 280/5.514 |
| 2014/0291090 A1* | 10/2014 | Shimasaki | 188/315 |

FOREIGN PATENT DOCUMENTS

| | | |
|---|---|---|
| JP | 02-129983 U | 10/1990 |
| JP | 04-034238 A | 2/1992 |
| JP | 08-022680 B | 3/1996 |
| JP | 2001-200880 A | 7/2001 |
| JP | 2010-084924 A | 4/2010 |

* cited by examiner

EXTENSION STROKE

COMPRESSION STROKE

VEHICLE HEIGHT CONTROL DEVICE FOR MOTORCYCLE

CROSS-REFERENCE TO RELATED APPLICATIONS

This application is based on and claims priority under 35 U.S.C. 119 from Japanese Patent Application No. 2012-274040 filed on Dec. 14, 2012, the entire content of which is incorporated herein by reference.

BACKGROUND

1. Technical Field

The present invention relates to a vehicle height control device for a motorcycle.

2. Related Art

A motorcycle preferably has a low vehicle height at the time of stopping such that even short riders can set their feet easily on the ground, as this prevents the motorcycle from falling down. On the other hand, the vehicle height of the motorcycle needs to be relatively high during travel from the viewpoint of a bank angle, a shock absorbing capability, and the like. Furthermore, in some American model motorcycles, etc., riders desire the low vehicle height at the time of stopping in terms of appearance.

Thus, a vehicle height control device for a motorcycle has been proposed as described in Patent Literature 1 (JP-B-H08-022680). The vehicle height control device includes a damper tube provided on one of a vehicle body side and an axle side, a piston rod provided on the other of the vehicle body side and the axle side and sliding through an oil chamber in the damper tube to extend and contract with respect to the damper tube, a hydraulic jack provided on one side of the damper tube and the piston rod, a suspension spring interposed between a spring bearing supported by a plunger inserted into a jack chamber in the hydraulic jack and a spring bearing provided on the other side of the damper tube and the piston rod, a hydraulic pump performing a pumping operation in conjunction with extending and contracting motion of the piston rod with respect to the damper tube to feed oil in the oil chamber in the damper tube to the jack chamber in the hydraulic jack and to discharge oil from the jack chamber, and a selector valve which is closed to stop the hydraulic oil fed into the jack chamber in the hydraulic jack and which is opened to discharge the hydraulic oil, thereby enabling vehicle height control with extending and contracting motion of the piston rod.

SUMMARY OF INVENTION

However, when a vehicle height control unit including a hydraulic jack, a hydraulic pump, and a selector valve is provided in a damper such as a front fork, the configuration of the damper needs to be significantly changed.

Furthermore, even when a vehicle speed decreases to a set value or smaller and then a vehicle height reducing operation is performed, if a vehicle is rapidly decelerated, the conventional vehicle height control device may fail to sufficiently reduce the vehicle height within a short time until the vehicle stops.

Additionally, in a motorcycle with a pair of dampers disposed on respective laterally opposite sides of a vehicle body, when a vehicle height control unit (including a hydraulic jack, a hydraulic pump, and a selector valve) is provided in each of the dampers, the vehicle height control device involves a large occupied space, a heavy weight, and high costs.

An object of the present invention is to simply configure a damper provided with a vehicle height control unit.

Another object of the present invention is to provide a vehicle height control device that inevitably reduces the vehicle height when a vehicle stops so that rider's feet can appropriately touch the ground.

Yet another object of the present invention is to provide a motorcycle with a pair of dampers disposed on respective laterally opposite sides of a vehicle body, the motorcycle including a compact vehicle height control device.

[1] An aspect of the invention provides a vehicle height control device for a motorcycle with a pair of dampers disposed on laterally opposite sides of a vehicle body, the vehicle height control device comprising: a vehicle height control unit provided in at least one of the left and right dampers, in which the damper provided with the vehicle height control unit includes: a wheel-side outer tube; a vehicle body-side inner tube slidably inserted into the wheel-side outer tube; a hollow pipe installed upright in an inner bottom portion of the outer tube and including a partition wall portion that is in sliding contact with an inner periphery of the inner tube; a piston provided on an inner periphery of a leading end portion of the inner tube; an oil chamber provided on an outer periphery of the hollow pipe in such a manner that the piston advances into and retracts from the oil chamber, the oil chamber being partitioned by the piston into an upper oil chamber above the piston and a lower oil chamber below the piston; and an oil reservoir chamber defined by an inner periphery of the hollow pipe and spanning to an upper portion of the inner tube, the oil reservoir chamber having an upper portion that forms an air chamber, and in which the vehicle height control unit includes: a hydraulic jack including a jack housing and a plunger, the jack housing being provided at an upper end portion of the inner tube such that the plunger defining a jack chamber of the hydraulic jack is fitted on the jack housing so as to be movable up and down; a suspension spring provided between an upper end of the hollow pipe and the plunger of the hydraulic jack; a hydraulic pump including a pump housing and a pump pipe, the pump housing being provided at the plunger of the hydraulic jack and forming a pump chamber of the hydraulic pump such that the pump pipe installed upright at the upper end of the hollow pipe and communicating with the oil reservoir chamber on the inner periphery of the hollow pipe is slidably inserted into the pump chamber in the pump housing; and a selector valve controlling a vehicle height by adjusting an amount of hydraulic oil fed to the jack chamber in the hydraulic jack by the hydraulic pump that performs a pumping operation in conjunction with extending and contracting motion of the hollow pipe with respect to the inner tube.

[2] The vehicle height control device for the motorcycle according to [1], may further comprises: a detection unit that detects a height position of the plunger of the hydraulic jack; and a control unit that opens or closes the selector valve in a controllable manner according to a result of the detection by the detection unit.

[3] The vehicle height control device for the motorcycle according to [1], may have a configuration in which the selector valve is provided at the upper end portion of the inner tube.

[4] The vehicle height control device for the motorcycle according to [2], may have a configuration in which the selector valve is provided at the upper end portion of the inner tube.

[5] The vehicle height control device for the motorcycle according to [2] or [4], may have a configuration in which the control unit predicts a stoppage predicted time of a vehicle, and when the predicted stoppage predicted time is equal to or less than a reference stoppage time, and the control unit enters a vehicle height reducing control mode to switch the selector valve, which enables a vehicle height reducing operation.

[6] The vehicle height control device for the motorcycle according to any one of [1] to [5], may have a configuration in which the vehicle height control unit is provided only in one of the left and right dampers.

[7] The vehicle height control device for the motorcycle according to [6], may have a configuration in which a suspension spring is provided in the other of the left and right the dampers, and a spring load on the suspension spring provided in the one of the left and right dampers is set higher than a spring load on the suspension spring provided in the other of the left and right dampers.

[8] The vehicle height control device for the motorcycle according to [6], may have a configuration in which a suspension spring is not provided in the other of the left and right dampers.

[9] The vehicle height control device for the motorcycle according to [8], may have a configuration in which an amount by which the hydraulic jack provided in the one of the left and right dampers elevates and lowers is equivalent to double an amount by which the hydraulic jack elevates and lowers assuming a case that vehicle height control units are respectively provided in the left and right dampers.

[10] The vehicle height control device for the motorcycle according to any one of [6] to [9], may have a configuration in which a main damping force generator is provided in the other of the left and right dampers, and in the one of the left and right dampers, the damping force generator is not provided or only an auxiliary damping force generator is provided.

With the configuration of [1], the damper provided with the vehicle height control unit can be simply configured.

With the configuration of [2], based on the result of the detection by the detection unit, the plunger of the hydraulic jack can be set to any height position, and thus the vehicle height can be adjusted to any height position.

With the configuration of [3] and [4], the selector valve formed of a solenoid or the like can be disposed at a sprung position above the suspension spring where an input of vibration is small.

With the configuration of [5], the vehicle height starts to be reduced during travel when the vehicle is about to stop. The vehicle height is completely reduced within a short time until the vehicle stops. This allows the rider's feet to appropriately touch the ground, thus ensuring stability.

With the configuration of [6], this enables a reduction in the occupied space, weight, and costs of the vehicle height control device.

With the configuration of [7], the suspension spring in the damper subjected to an increased load on the spring bearings as a result of providing the vehicle height control unit has an enhanced capability of supporting the damper.

With the configuration of [8], this enables a reduction in the occupied space, weight, and costs of the vehicle height control device.

With the configuration of [9], the spring load on the suspension spring can be substantially doubled due to the deflection of the suspension spring caused by providing the vehicle height control unit and the suspension spring only in the one of the dampers.

With the configuration of [10], the main damping force generator is provided in the damper in which the vehicle height control unit is not provided. In the damper provided with the vehicle height control unit, the damping force generator is not provided or only the auxiliary damping force generator is provided. Hence, the left and right dampers can be balanced in weight.

BRIEF DESCRIPTION OF DRAWINGS

FIGS. 8A and 8B are schematic diagrams showing a vehicle height increasing control mode, wherein FIG. 8A is a schematic diagram illustrating an extension stroke, and FIG. 8B is a schematic diagram illustrating a compression stroke;

DESCRIPTION OF EMBODIMENTS

Figure 1:
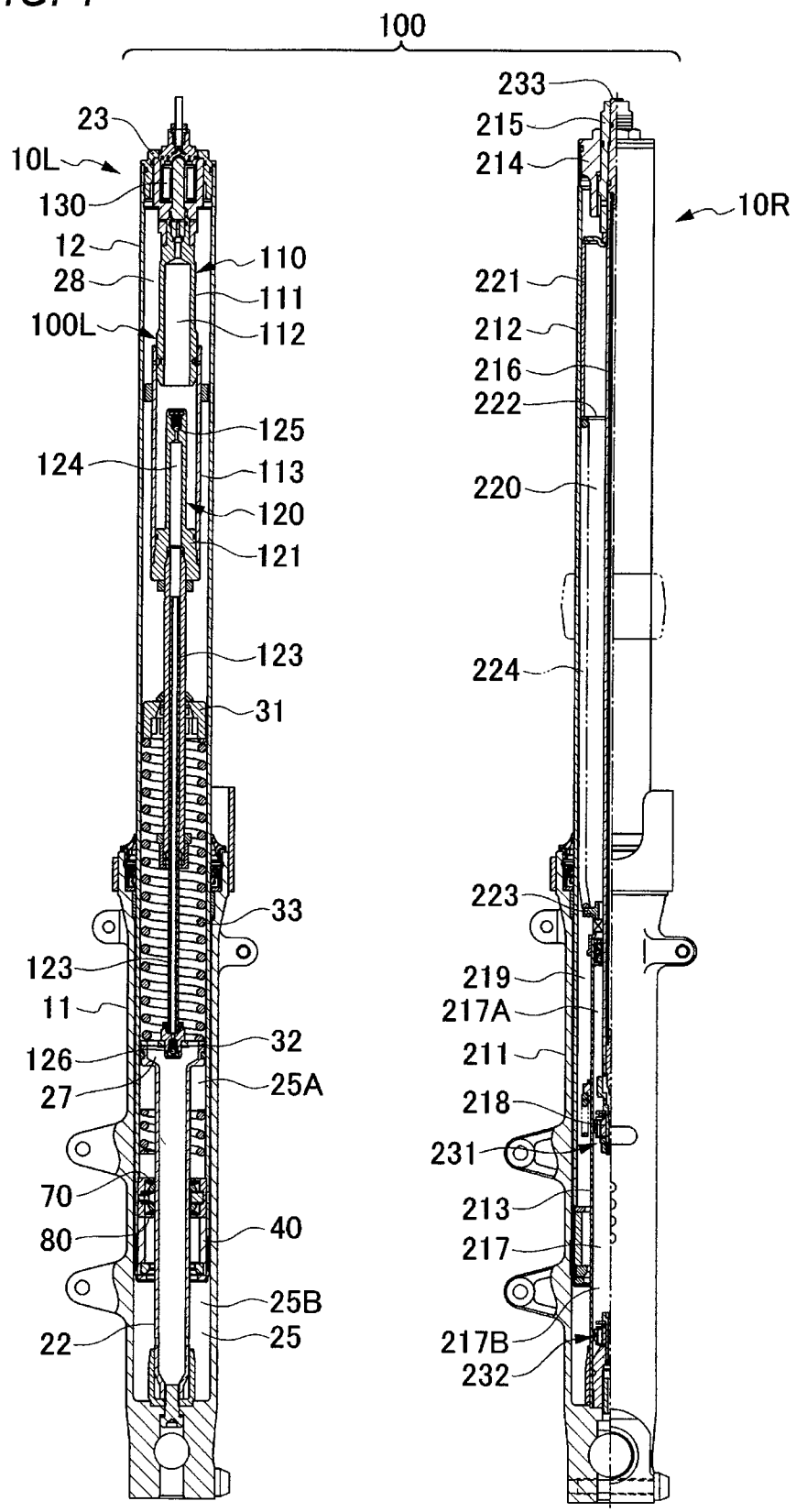
FIG. 1 is a cross-sectional view showing a left damper and a right damper included in an example of a vehicle height control device.

FIG. 1 shows a pair of dampers 10L and 10R disposed on a left side and a right side, respectively, of a vehicle so as to form a front fork of a motorcycle. In this case, in the motorcycle according to the present embodiment, a vehicle height control device 100 is configured by providing a vehicle height control unit 100L only in one of the left and right dampers, that is, the damper 10L. The damper 10L and the damper 10R will be described below in detail.

(Configuration of the Damper 10L) (FIG. 1 to FIG. 8B)

Figure 2:
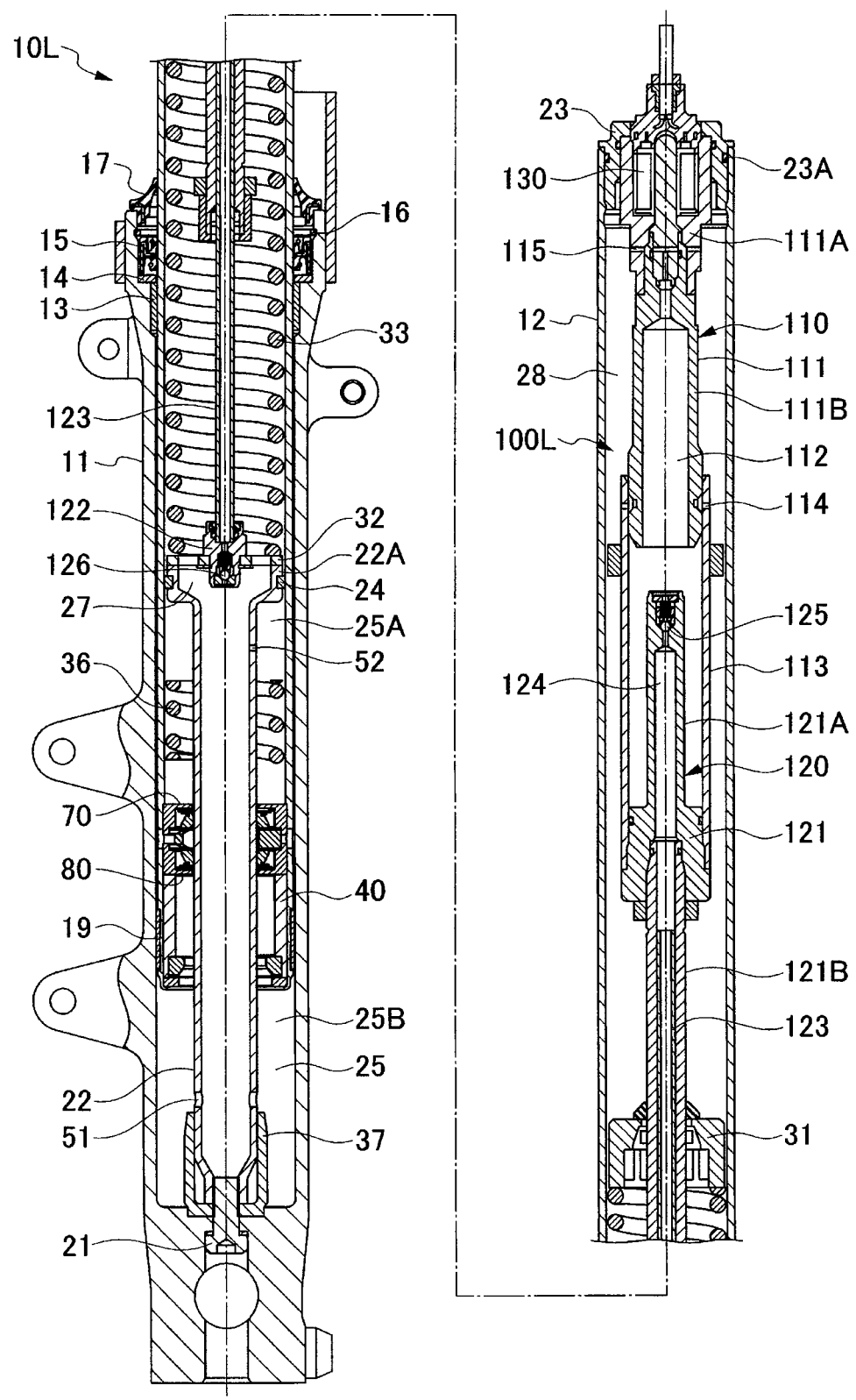
FIG. 2 is a cross-sectional view showing the damper.
Figure 3:
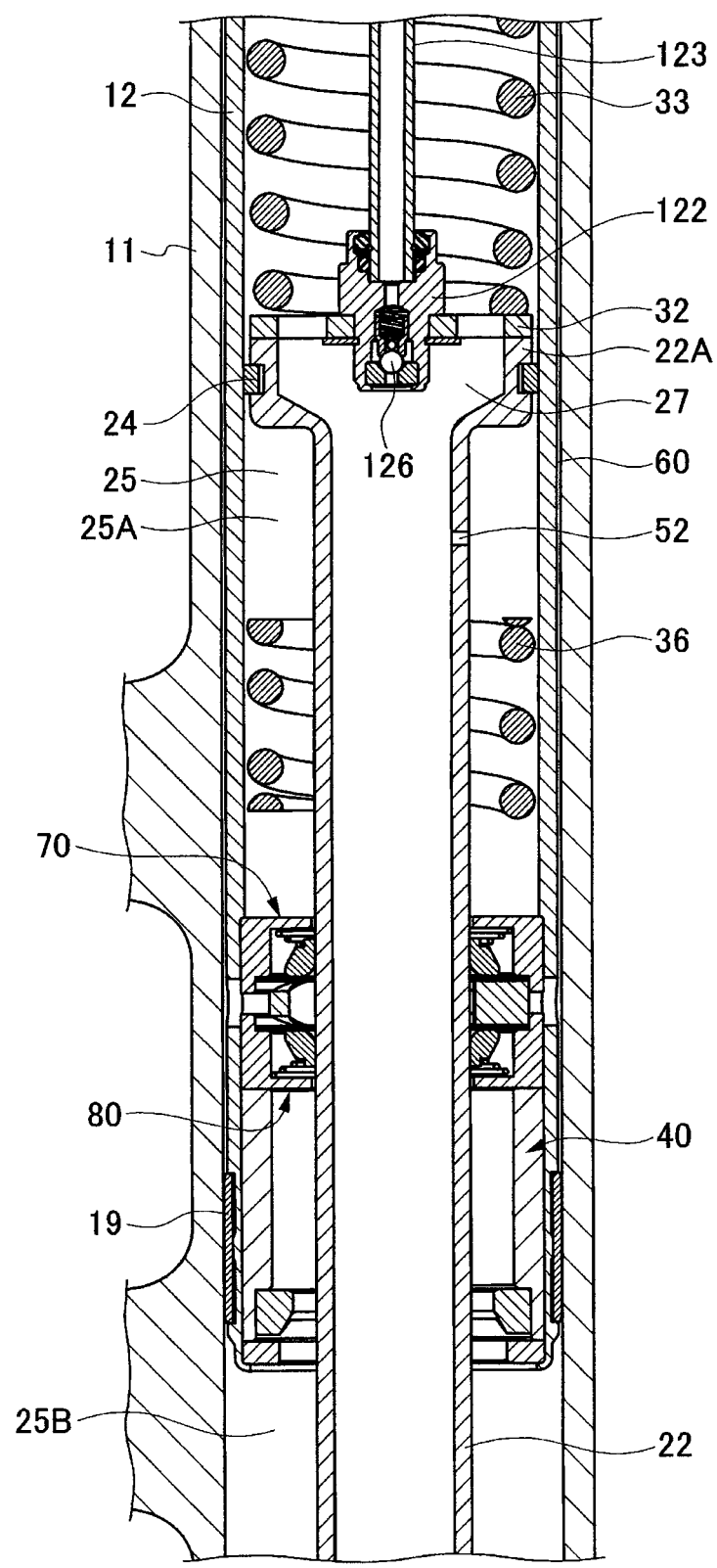
FIG. 3 is a cross-sectional view of an important part of the damper.

In the damper 10L, a vehicle body-side inner tube 12 is slidably inserted into a wheel-side outer tube 11 which is closed at one end and which is open at the other end, as shown in FIG. 1 to FIG. 3. At an open end of the outer tube 11 through which the inner tube 12 is inserted, a slide guide 13, seal spacer 14, an oil seal 15, a stopper ring 16, and dust seal 17 are provided. A slide guide 19 is provided on an outer peripheral portion of a lower end of the inner tube 12 which is inserted into the outer tube 11.

In a bottom portion of the outer tube 11, a bolt 21 is interposed via a copper packing, and a hollow pipe 22 fixed by the bolt 21 is installed upright. The bolt 21 is screwed in a threaded portion on an inner periphery of a reduced diameter portion of the hollow pipe 22 located under a tapered portion at a lower end of the hollow pipe 22. An outer periphery of a lower end portion of a cap bolt 23 is screwed in an upper end portion of the inner tube 12 via an O ring 23A.

A jack housing 111 of a hydraulic jack 110 described below is attached to the cap bolt 23. A suspension spring 33 formed of a compression coil spring is provided between a spring bearing 31 supported by a plunger 113 fitted on the jack housing 111 and a spring bearing 32 seated on an upper end surface of an increased-diameter partition wall portion 22A provided at an upper end portion of the hollow pipe 22. In the present embodiment, the plunger 113 supports the spring bearing 31 attached to an outer periphery of an intermediate portion of a lower pump housing 121B via an upper pump housing 121A of a pump housing 121 of a hydraulic pump 120 attached to the plunger 113.

The partition wall portion 22A is provided at the upper end portion of the hollow pipe 22, and a piston ring 24 that is in sliding contact with an inner periphery of the inner tube 12 is inserted in an annular groove on an outer periphery of the partition wall portion 22A. An oil chamber 25 described below is provided on an outer periphery of a lower portion of the partition wall portion 22A of the hollow pipe 22.

A piston 40 is provided on an inner periphery of a leading end portion (lower end portion) of the inner tube 12 inserted into the outer tube 11. The piston 40 includes an upper damping force generator 70 and a lower damping force generator 80 described below.

The piston 40 in the leading end portion of the inner tube 12 advances into and retracts from the oil chamber 25 on the outer periphery of the hollow pipe 22 and partitions the oil chamber 25 into an upper portion and a lower portion. That is, an upper oil chamber 25A is formed by the inner tube 12, the hollow pipe 22, the partition wall portion 22A, and the piston 40. A lower oil chamber 25B is formed by a portion of the outer tube 11 located below the piston 40 and the hollow pipe 22.

An oil reservoir chamber 27 spanning to an upper portion of the inner tube 12 is defined by the inner periphery of the hollow pipe 22. Hydraulic oil is filled in the oil reservoir chamber 27, and an upper portion of the oil reservoir chamber 27 forms an air chamber 28. The oil chamber 25 on the outer periphery of the hollow pipe 22 is in communication with the oil reservoir chamber 27 on the inner periphery of the hollow pipe 22. A hole-like volume compensation passage 51 is formed in the hollow pipe 22 by drilling to compensate for a volume of oil equivalent to an amount by which the inner tube 12 advances into and retracts from the oil chamber 25 on the outer periphery of the hollow pipe 22.

The hollow pipe 22 includes an orifice 52 formed immediately below the partition wall portion 22A by drilling. A portion of the oil in the upper oil chamber 25A, the pressure of which is increased during an extension step, flows through the orifice 52 into the oil reservoir chamber 27 on the inner periphery of the hollow pipe 22.

An annular gap chamber 60 is provided between the outer tube 11 and the inner tube 12 with being sandwiched between the slide guide 13 fixed to the inner periphery of the outer tube 11 and the slide guide 19 fixed to the outer periphery of the inner tube 12. A hole 61 is formed by drilling in a portion of the inner tube 12 in which the piston 40 is provided. A gap 62 is formed in the piston 40 by drilling. The hole 61 and the gap 62 allow the annular gap chamber 60 to communicate with the oil chamber 25 (the upper oil chamber 25A and the lower oil chamber 25B) on the outer periphery of the hollow pipe 22. Thus, the hydraulic oil is supplied to the annular gap chamber 60 to lubricate the slide guides 13 and 19 and to carry out volume compensation.

A rebound spring 36 in a maximum extension state corresponding to the stroke end of the extension stroke is installed between the piston 40 provided in the inner tube 12 and the partition wall portion 22A provided in the hollow pipe 22, to regulate a maximum extension stroke. Furthermore, an oil lock piece 37 is sandwiched between a lower end portion of the hollow pipe 22 and the bottom portion of the outer tube 11. In a maximum compression state corresponding to the stroke end of a compression stroke, an oil lock collar 38 provided on an inner periphery of a lower end of the piston 40 presses the hydraulic oil around the oil lock piece 37 to regulate a maximum compression stroke.

Figure 4:
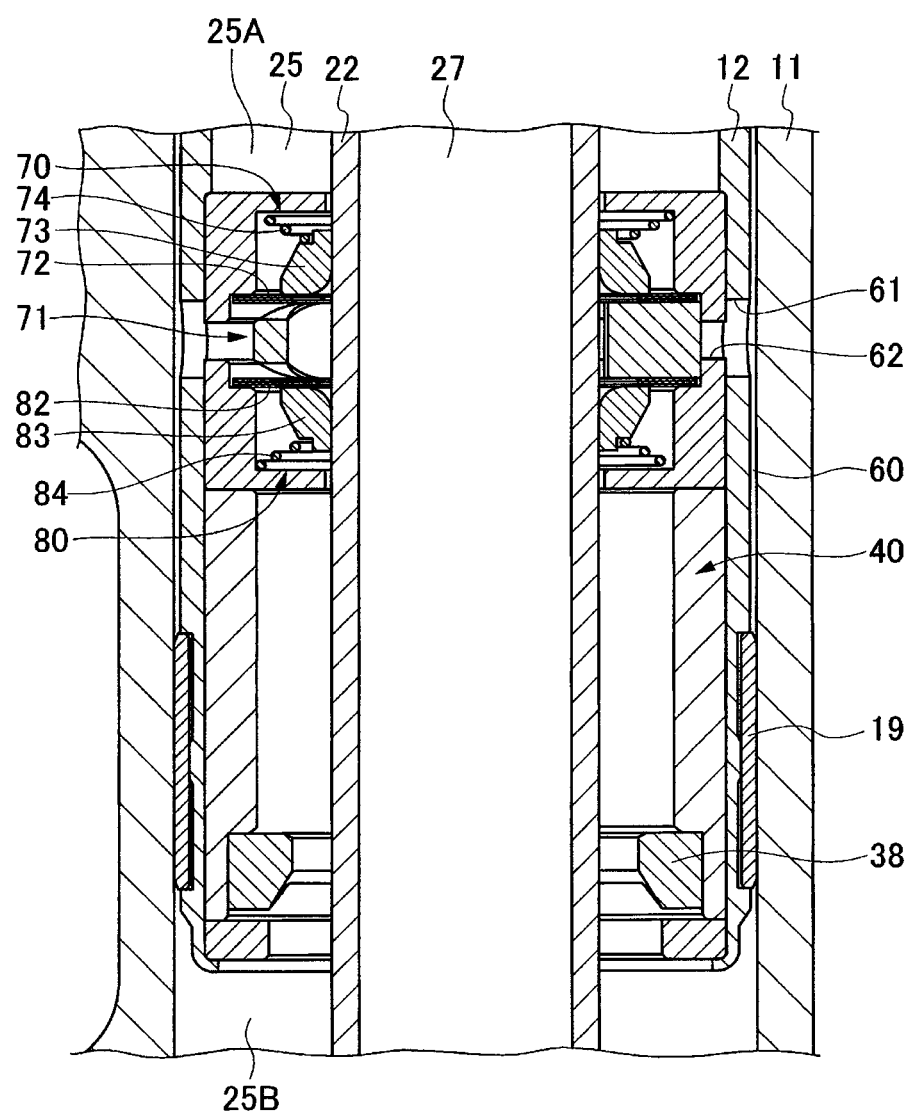
FIG. 4 is an enlarged view of an import part of FIG. 3.

As shown in FIG. 4, the upper damping force generator 70 is provided between the upper oil chamber 25A on the outer periphery of the hollow pipe 22 and the lower oil chamber 25B (and the hole 61 formed in the inner tube 12 and communicating with the annular gap chamber 60). The upper damping force generator 70 permits oil to flow into the upper oil chamber 25A during the compression stroke and applies passage resistance to oil flowing out from the upper oil chamber 25A during the extension stroke.

Figure 5A:
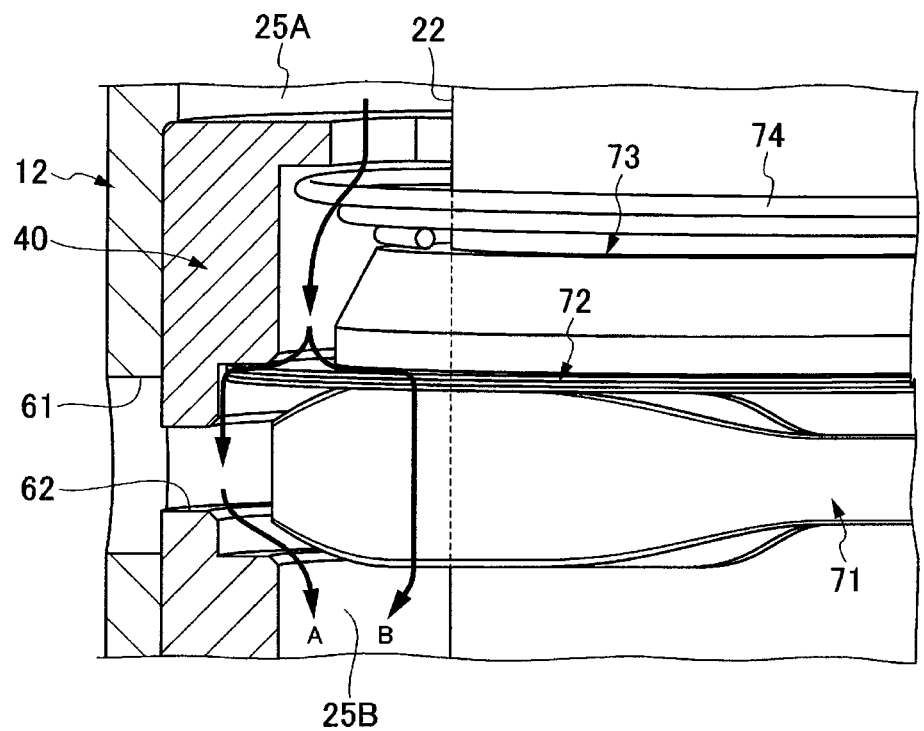
FIG. 5A is a schematic side view of a part of a damping force generator.
Figure 5B:
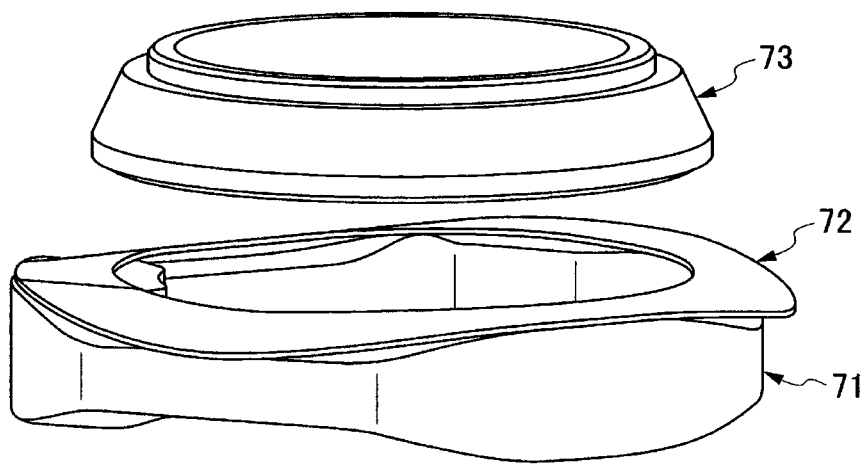
FIG. 5B is a schematic perspective view of the part of the damping force generator.
Figure 6:
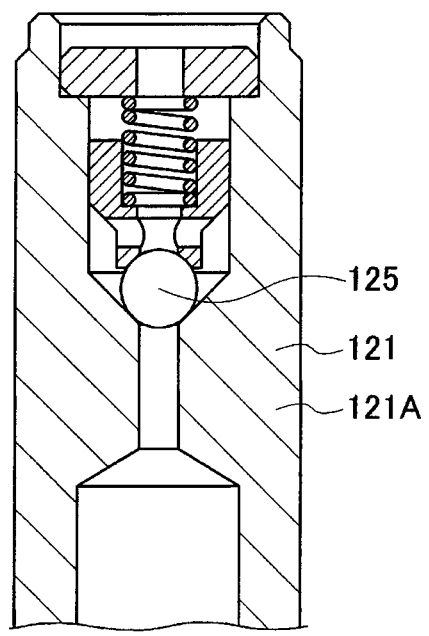
FIG. 6 is a cross-sectional view of a discharge check valve.
Figure 7:
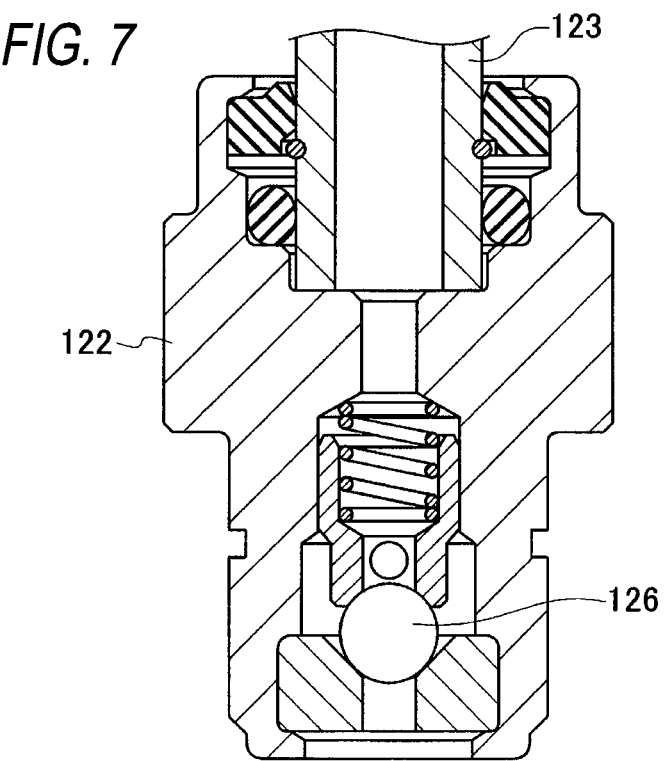
FIG. 7 is a cross-sectional view of a suction check valve.

As shown in FIG. 4 and FIGS. 5A and 5B, the upper damping force generator 70 includes an extension-side damping valve 72, a compression-side check valve 73, and a valve spring 74 stacked in order on a side of a valve seat 71 fixed to the piston 40 which is closer to the upper oil chamber 25A. During the extension stroke, the upper damping force generator 70 pushes open a channel A on an outer periphery of the extension-side damping valve 72 and a channel B on an inner periphery of the extension-side damping valve 72 by means of a high pressure in the upper oil chamber 25A to generate an extension-side damping force. During the compression stroke, the upper damping force generator 70 pushes open the compression-side check valve 73 by means of a high pressure in the lower oil chamber 25B.

As shown in FIG. 4, the lower damping force generator 80 is provided between the lower oil chamber 25B on the outer periphery of the hollow pipe 22 and the upper oil chamber 25A (and the hole 61 formed in the inner tube 12 and communicating with the annular gap chamber 60). The lower damping force generator 80 permits oil to flow into the lower oil chamber 25B during the extension stroke and applies passage resistance to oil flowing out from the lower oil chamber 25B during the compression stroke.

The lower damping force generator 80 shares the valve seat 71 in the upper damping force generator 70 and includes a compression-side damping valve 82, an extension-side check valve 83, and a valve spring 84 stacked in order on a side of the valve seat 71 fixed to the piston 40 which is closer to the lower oil chamber 25B. During the compression stroke, the lower damping force generator 80 pushes open the compression-side damping valve 82 by means of the high pressure in the lower oil chamber 25B to generate a compression-side damping force. During the extension stroke, the lower damping force generator 80 pushes open the extension-side check valve 83 by means of the high pressure in the upper oil chamber 25A.

Thus, the damper 10L buffers an impact force applied by the road surface, by means of the spring force of the suspension spring 33 and the spring force of the air chamber 28, and damps stretching vibration involved in the absorption of the impact force by the suspension spring 33 and the air chamber 28, by means of the compression- and extension-side damping forces generated by the upper damping force generator 70 and the lower damping force generator 80.

Now, the vehicle height control unit 100L will be described which is installed only in the one of the left and right dampers, that is, the damper 10L, in order to provide the vehicle height control device 100.

(Vehicle Height Control Unit 100L of the Vehicle Height Control Device 100) (FIG. 2 and FIG. 6 to FIG. 10)

Figure 10:
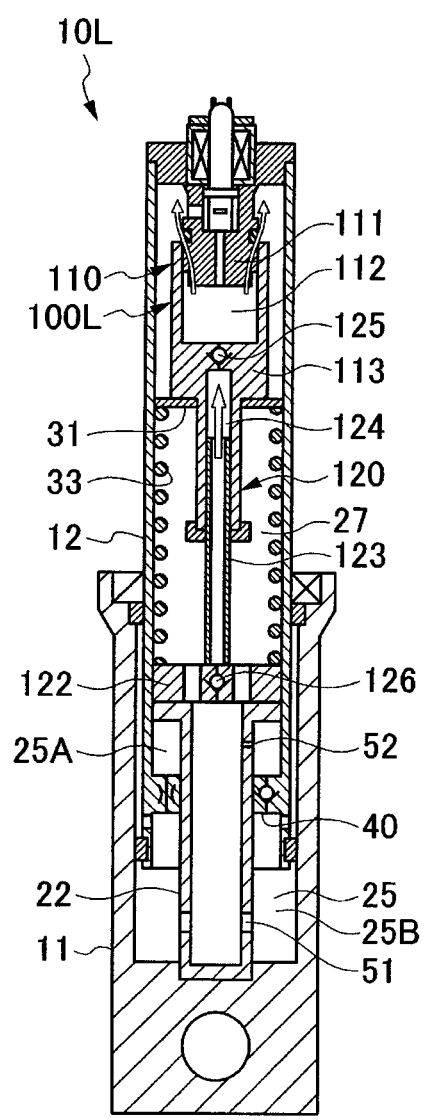
FIG. 10 is a schematic view showing a vehicle height retaining mode of the damper.

As shown in FIG. 2, the vehicle height control unit 100L of the vehicle height control device 100 includes the jack housing 111 (an assembly of an upper jack housing 111A and a lower jack housing 111B) of the hydraulic jack 110 attached to the cap bolt 23 provided at the upper end portion of the inner tube 12. A hollow plunger 113 that defines a jack chamber 112 of the hydraulic jack 110 is fitted on a lower-end-side outer periphery of the jack housing 111 so as to be movable up and down. The jack chamber 112 is defined by the jack housing 111, the plunger 113, and a pump housing 121 described below. The hydraulic jack 110 includes an oil return passage 114 formed in the plunger 113 and through which the hydraulic oil in the jack chamber 112 is returned to the oil reservoir chamber 27 when the plunger 113 reaches a projecting end projecting from the jack chamber 112 (FIG. 2 and FIG. 10).

The pump housing 121 (an assembly of an upper pump housing 121A and a lower pump housing 121B) of the hydraulic pump 120 is fixedly attached to a lower-end-side inner periphery of the plunger 113 of the hydraulic jack 110. A pump pipe 123 is fixedly installed upright on a connector 122 attached to the upper end portion of the hollow pipe 22. The pump pipe 123 is in communication with the oil reservoir chamber 27 on the inner periphery of the hollow pipe 22 and is slidably inserted in the pump housing 121. Hollow portions of the pump housing 121 and the pump pipe 123 are in communication with each other to define a pump chamber 124.

Figure 8A:
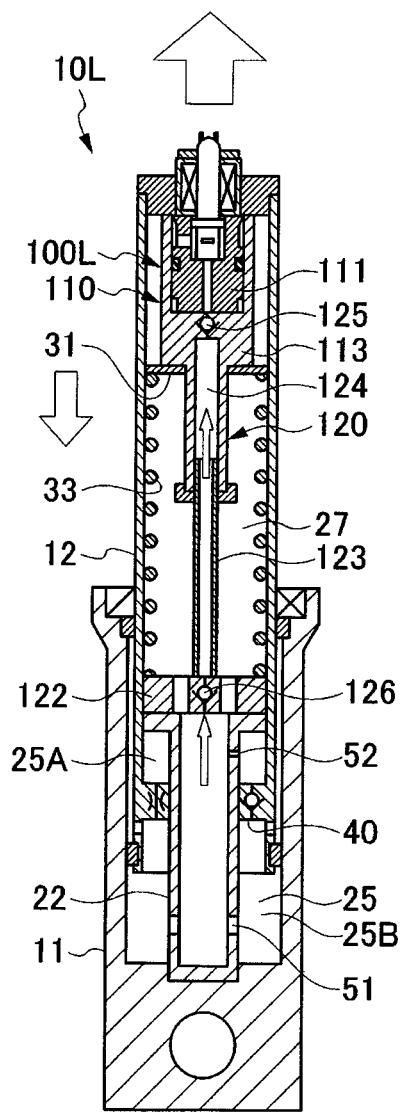
Figure 8B:
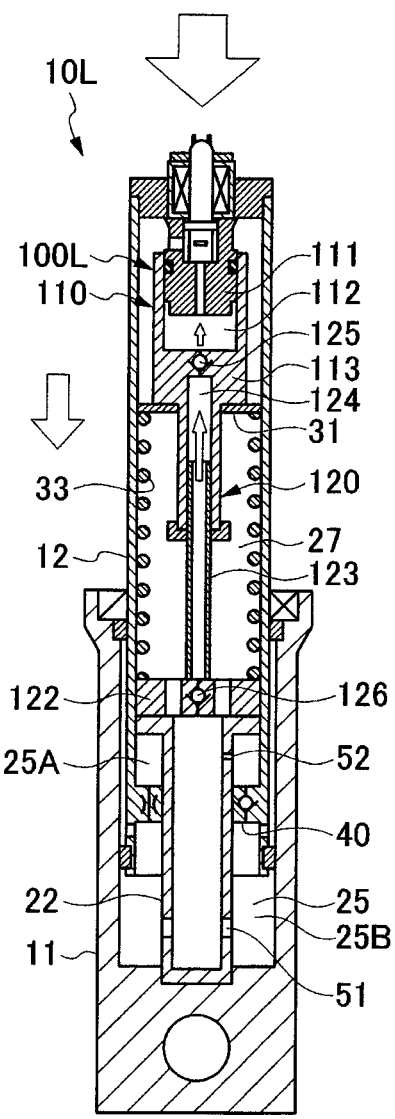

The hydraulic pump 120 includes a discharge check valve 125 disposed at an upper end portion of the pump housing 121 and which allows the hydraulic oil in the pump chamber 124, pressurized by contracting motion of the hollow pipe 22 and the pump pipe 123 advancing into the inner tube 12, to be discharged toward the hydraulic jack 110 side (FIG. 8B). A suction check valve 126 is provided in the connector 122, located on a lower end side of the pump pipe 123, to allow the hydraulic oil in the oil reservoir chamber 27 to be sucked into the pump chamber 124, which is set to a negative pressure by extending motion of the hollow pipe 22 and the pump pipe 123 retracting from the inner tube 12 (FIG. 8A).

Thus, the hydraulic pump 120 performs a pumping operation in conjunction with the extending and contracting motion of the hollow pipe 22 and the pump pipe 123 advancing into and retracting from the inner tube 12 when the damper 10L is vibrated by recesses and protrusions on the road surface while the vehicle is traveling. When the pump chamber 124 is pressurized by the pumping operation resulting from the contracting motion of the hollow pipe 22, the oil in the pump chamber 124 opens the discharge check valve 125 and is discharged toward the hydraulic jack 110 side. When the pump chamber 124 is set to the negative pressure by the pumping operation resulting from the extending motion of the hollow pipe 22, the oil in the oil reservoir chamber 27 opens the suction check valve 126 and is sucked into the pump chamber 124.

Figure 9:
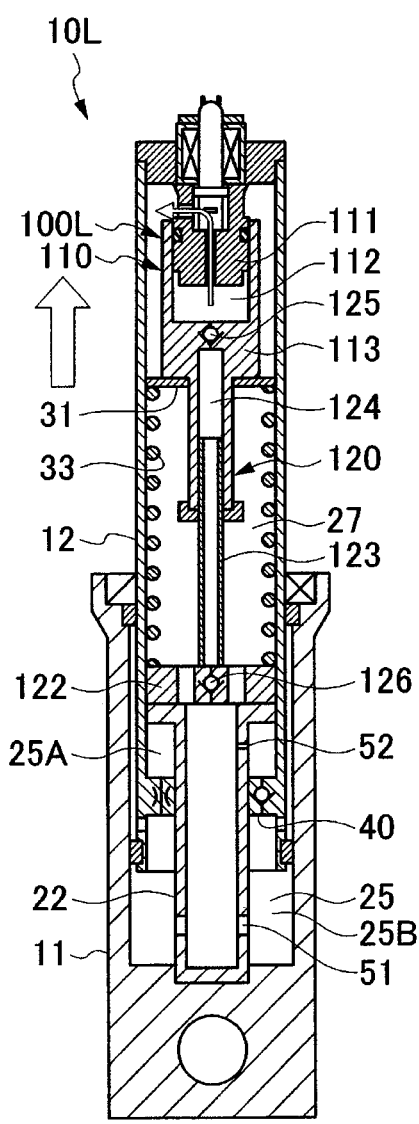
FIG. 9 is a schematic diagram showing a vehicle height reducing control mode of the damper.

The vehicle height control unit 100L has a selector valve 130 which is closed to stop the hydraulic oil supplied to the jack chamber 112 of the hydraulic jack 110 or which is opened to discharge the hydraulic oil into the oil reservoir chamber 27 as shown in FIG. 9. The selector valve 130 according to the present embodiment is formed of a solenoid valve and built in the cap bolt 23 of the inner tube 12 to open and close a communication path 115 between the oil reservoir chamber 27 and the jack chamber 112, provided in the jack housing 111 (upper jack housing 111A) of the hydraulic jack 110.

Figure 11:
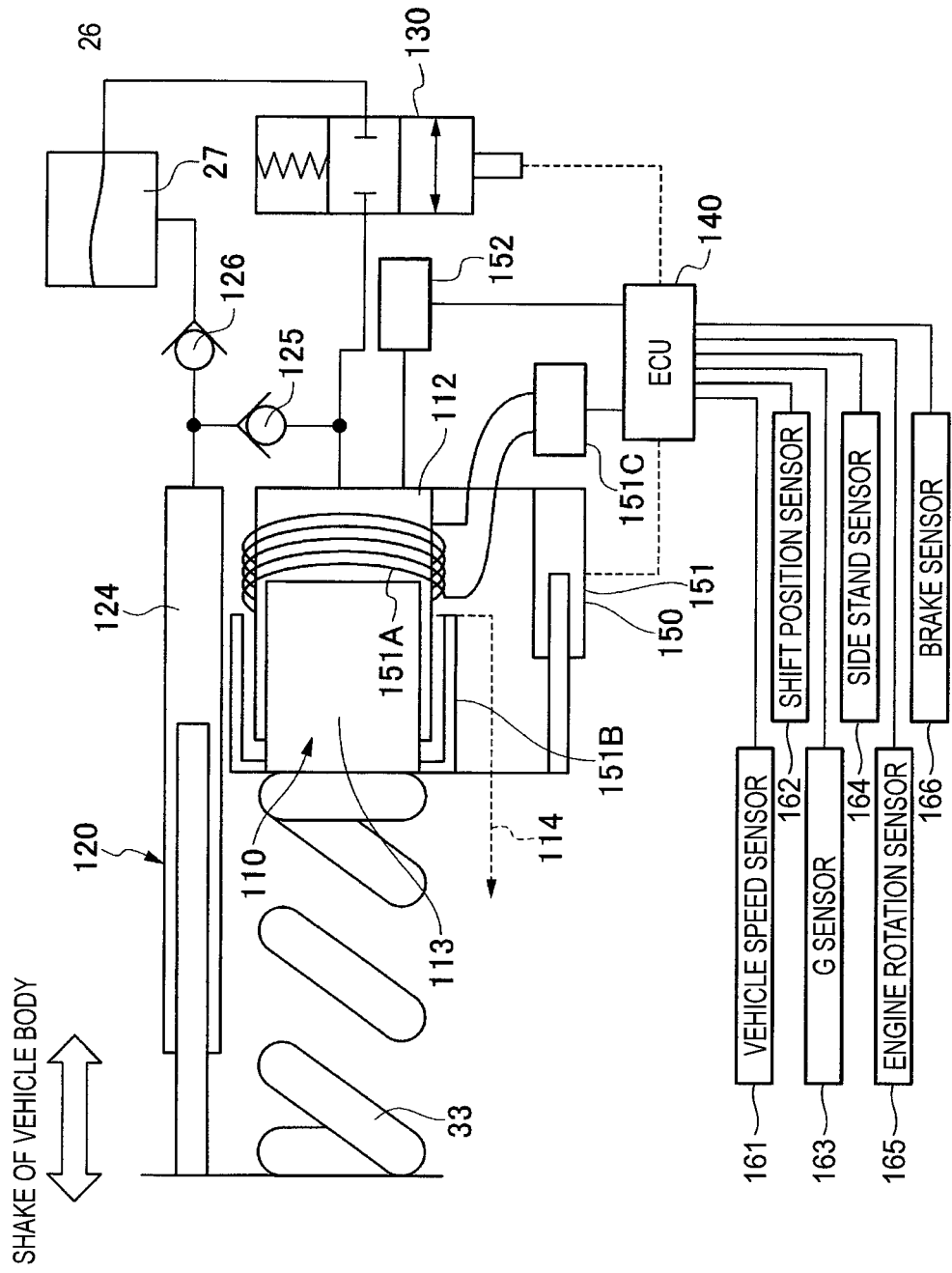
FIG. 11 is a circuit diagram showing an example of a control circuit.

The vehicle height control device 100 has a control circuit shown in FIG. 11. An ECU (control unit) 140 opens and closes the selector valve 130 in a controllable manner to allow the hydraulic pump 120, which performs a pumping operation in conjunction with the extending and contracting motion of the hollow pipe 22 with respect to the inner tube 12, to control the level of the hydraulic oil (the amount of the hydraulic oil) supplied to the jack chamber 112 of the hydraulic jack 110 and thus the projecting height of the plunger 113 projecting from the jack chamber 112. As a result, the vehicle height of the vehicle is controlled.

The ECU 140 according to the present embodiment receives detection signals from a vehicle height detection unit 150, a vehicle speed sensor 161, a shift position sensor 162, a G sensor (acceleration and deceleration sensor) 163, a side stand sensor 164, an engine rotation sensor 165, a brake sensor 166, and the like to turn on and off the selector valve 130, formed of a solenoid valve, in a controllable manner.

The vehicle height detection unit 150 adopted may be one of projecting height detection unit 151 for detecting the height position of the plunger 113 in the hydraulic jack 110, hydraulic-pressure detection unit 152 for detecting a hydraulic pressure in the jack chamber 112 of the hydraulic jack 110, and extension and compression stroke length detection unit 153 (not shown in the drawings) for detecting the extension and compression stroke lengths of the inner tube 12 relative to the outer tube 11 or a combination of two or more of these unit.

The vehicle height detection unit 150 according to the present embodiment adopts an inductance-based projecting height detection unit 151 for detecting the projecting height of the plunger 113. For example, as shown in FIG. 11, the projecting height detection unit 151 includes a coil 151A wound around an outer periphery of the hydraulic jack 110 and a cover 151B provided for the plunger 113 and disposed over an outer periphery of the hydraulic jack 110. The projecting height detection unit 151 changes the impedance of the coil 151A in accordance with displacement of the plunger 113. An output from the coil 151A is transmitted to the ECU 140 via a signal processing circuit 151C. The ECU 140 detects the projecting height of the plunger 113 based on the oscillation frequency of the coil 151A output by the signal processing circuit 151C. The projecting height detection unit 151 adopted may be based on a Hall element, capacitance, or the like instead of inductance.

In conjunction with a vehicle height control operation of the motorcycle, the vehicle height control device 100 will be described which adopts the control circuit in FIG. 11 using the selector valve 130 formed of a single two-port two-position solenoid valve. The selector valve 130 in FIG. 11 is of a normally closed type (however, the selector valve 130 may be of a normally open type).

In a vehicle height reducing control mode in which the ECU 140 outputs an on signal, the selector valve 130 is opened to connect the jack chamber 112 of the hydraulic jack 110 to the oil reservoir chamber 27 in the damper 10L. The hydraulic pump 120 discharges the hydraulic oil supplied to the jack chamber 112 of the hydraulic jack 110 into the oil reservoir chamber 27 to reduce the fluid level in the jack chamber 112 and thus the projecting height of the plunger 113. Thus, a vehicle height reducing operation can be performed.

In a vehicle height increasing control mode in which the ECU 140 outputs an off signal, the selector valve 130 is closed to shut the jack chamber 112 of the hydraulic jack 110 off from the oil reservoir chamber 27 in the damper 10L. The hydraulic pump 120 is prevented from discharging the hydraulic oil supplied to the jack chamber 112 of the hydraulic jack 110, enabling a vehicle height maintaining operation or a vehicle height increasing operation. At this time, the hydraulic pump 120 performs a pumping operation in conjunction with the above-described extending motion of the hollow pipe 22 to suck the oil in the oil reservoir chamber 27 into the pump chamber 124 through the suction check valve 126. Then, the hydraulic pump 120 performs a pumping operation in conjunction with the above-described contracting motion of the hollow pipe 22 to feed the oil in the pump chamber 124 into the jack chamber 112 of the hydraulic jack 110 through the discharge check valve 125. Thus, a vehicle height increasing operation can be performed.

Specifically, control modes carried out by the vehicle height control device 100 are as described below.

(A) Vehicle Height Reducing Control Mode

In the vehicle height increasing control mode in which the selector valve 130 is closed to enable a vehicle height increasing operation while the vehicle is traveling or is stopped for a long time, the ECU 140 in the vehicle height control device 100 shifts to the vehicle height reducing control mode in which the selector valve 130 is opened according to any one of the following control conditions 1 to 3.

1. Vehicle Speed Control

When the vehicle speed V of the vehicle is equal to or lower than a vehicle-height-reduction-starting vehicle speed Vd (V≤Vd), the ECU 140 enters the vehicle height reducing control mode to open the selector valve 130 to enable a vehicle height reducing operation.

The ECU 140 presets the vehicle speed Vd. The vehicle speed Vd is, for example, 10 km/h.

2. Stoppage Prediction Time Control

The ECU 140 predicts a stoppage predicted time T for the vehicle. When the predicted stoppage predicted time T is equal to or less than a predetermined reference stoppage time Ta (T≤Ta), the ECU 140 enters the vehicle height reducing control mode to open the selector valve 130 to enable a vehicle height reducing operation.

The ECU 140 calculates deceleration from the vehicle speed of the vehicle or from information from the G sensor, and predicts the stoppage predicted time T based on the deceleration.

The ECU 140 defines the reference stoppage time Ta to be a time required to discharge the hydraulic oil filled in the jack chamber 112 of the hydraulic jack 110 (the time required to discharge oil from the jack chamber 112 into the oil reservoir chamber 27 in the damper 10L via the selector valve 130).

In this case, the ECU 140 presets the reference vehicle speed Va at which the prediction of the stoppage predicted time T for the vehicle is to be started. Then, when the vehicle speed V of the vehicle becomes equal to or lower than the reference vehicle speed Va (V≤Va), the ECU 140 predicts the stoppage predicted time T.

Instead of using the above-described control conditions that T≤Ta and that V≤Va, the ECU 140 may enter the vehicle height reducing control mode to open the selector valve 130 to enable a vehicle height reducing operation when the deceleration a of the vehicle is equal to or lower than a reference deceleration aa (a aa).

The ECU 140 presets the reference speed Va, the reference stoppage time Ta, and the reference deceleration aa. The reference speed Va is, for example, 40 km/h, the reference stoppage time Ta is, for example, 2.5 sec, and the reference deceleration aa is, for example, 4 km/h/sec.

The stoppage predicted time is a parameter arithmetically predicted based on ever-changing vehicle motion parameters and representing an amount of time until the traveling vehicle stops in the immediately near future. The stoppage predicted time has a time dimension.

Actual comparative calculations may apparently involve no degree of "time" because, for example, the time dimension is divided into components for the respective sides of the comparison expression or comparison is carried out for each element.

For example, one of the simplest arithmetic expressions for the stoppage predicted time is $T=-V/\alpha=-V \cdot dt/dV$ (arithmetic expression for assumed constant acceleration). However, all of the following three comparison expressions have the same meaning. Even with a difference in comparison method resulting from the convenience of arithmetic operations, all of the comparison expressions effectively mean comparison with the stoppage predicted time.

$$T<c \ (c \text{ is a threshold; here, } c=Ta)$$

$$V<-c \cdot \alpha$$

$$-\alpha>c \cdot V$$

In the example in which comparison is carried out for each element, comparison may be performed for each of the elements V and α, used to calculate the stoppage predicted time, as in $(V<c1) \cap (-\alpha>c2)$ (c1 and c2 are thresholds). The results are ANDed together.

In this case, $T=-V/\alpha$ and thus the following expression is given: $Ta=(-c1)/(-c2)=c1/c2$.

3. Side Stand Control

Upon detecting resetting of a side stand of the vehicle from a standby position to an operating position, the ECU 140 enters the vehicle height reducing control mode and opens the selector valve 130 to enable a vehicle height reducing operation. The following control may also be performed. The ECU 140 monitors the vehicle speed. When the vehicle speed is equal to or higher than a very low speed (for example, 5 km/s), the ECU 140 avoids the reducing control even if the stand is in the operating position. The ECU 140 performs the reducing control only when the vehicle speed is zero.

(B) Vehicle Height Increasing Control Mode

In the vehicle height reducing control mode in which the selector valve is opened and kept open as described in (A), the ECU 140 in the vehicle height control device 100 shifts to the vehicle height increasing control mode in which the selector valve 130 is closed according to one of the following control conditions 1 to 4.

When entering the vehicle height increasing control mode to close the open selector valve 130, the ECU 140 turns off a voltage E0 applied to the selector valve 130 (E0=0 V).

1. Vehicle Speed Control

When the vehicle speed V exceeds the vehicle-height-reduction starting vehicle speed Vd (or a vehicle-height-increase starting vehicle speed Vu set independently of the vehicle-height-reduction starting vehicle speed Vd) (V>Vd or V>Vu), the ECU 140 halts the vehicle height reducing control mode, enters the vehicle height increasing control mode, and closes the selector valve 130 to enable a vehicle height increasing operation.

The ECU 140 presets the vehicle-height-reduction starting vehicle speed Vd (or the vehicle-height-increase starting vehicle speed Vu). The vehicle-height-reduction starting vehicle speed Vd or the vehicle-height-increase starting vehicle speed Vu is, for example, 40 km/h.

2. Stoppage Predicted Time Control

The ECU 140 predicts the stoppage predicted time T of the vehicle. When the predicted stoppage predicted time T exceeds a predetermined secondary reference stoppage time Tb (T>Tb), the ECU 140 halts the vehicle height reducing control mode, enters the vehicle height increasing control mode, and closes the selector valve 130 to enable the vehicle height increasing operation.

The ECU 140 predicts the stoppage predicted time T of the vehicle based on the deceleration (or acceleration) of the vehicle.

At this time, the ECU 140 predefines a secondary reference vehicle speed Vb at which the prediction of the stoppage time T of the vehicle is to be started. When the vehicle speed V exceeds the secondary reference vehicle speed Vb (V>Vb), the ECU 140 predicts the stoppage predicted time T.

In the stoppage predicted time control, the ECU 140 may halt the vehicle height reducing control mode, enter the vehicle height increasing control mode, and close the selector valve 130 to enable the vehicle height increasing operation when the acceleration of the vehicle exceeds a predetermined reference acceleration βb (β>βb) instead of using the above-described control conditions that T>Tb and that V>Vb.

The ECU 140 predefines the secondary reference vehicle speed Vb, the secondary reference stoppage time Tb, and the reference acceleration βb. The secondary reference vehicle speed Vb is, for example, 40 km/h, the secondary reference stoppage time Tb is, for example, 3 sec, and the reference acceleration βb is, for example, 5 km/h/sec.

3. Long-Stoppage Control

When the stoppage time of the vehicle is equal to or more than a predetermined continued stoppage time Tc, the ECU 140 halts the vehicle height reducing control mode, enters the vehicle height increasing control mode, and closes the selector valve 130 to enable a vehicle height increasing operation.

The ECU 140 predefines the continued stoppage time Tc of the vehicle. The continued stoppage time Tc is, for example, 30 sec.

4. Neutral Control

When the vehicle speed V=0 and the vehicle is in a neutral shift position, the ECU 140 halts the vehicle height reducing control mode, enters the vehicle height increasing control mode, and closes the selector valve 130 to enable a vehicle height increasing operation.

(c) Height Retaining Mode

While the vehicle is traveling, the ECU 140 in the vehicle height control device 100 retains the vehicle height at any intermediate height position preset as desired by opening or closing the selector valve 130 in a controllable manner based on a detection result from the vehicle height detection unit 150.

That is, an upper threshold for the vehicle height is set to a value H1, beyond which the vehicle height starts to be reduced, so at which the ECU 140 switches the selector valve 130 from an OFF operation (height increasing control mode) to an ON operation to open the selector valve 130. A lower threshold for the vehicle height is set to a value H2, below which the vehicle height starts to be increased, so at which the ECU 140 switches the selector valve 130 from the ON operation (height reducing control mode) to the OFF operation to close the selector valve 130. Thus, the ECU 140 retains the vehicle height of the motorcycle during travel at an intermediate height position between H1 and H2 based on the detection result from the vehicle height detection unit 150.

Thus, the vehicle height control device 100 as described above may retain the vehicle height at any intermediate height position between the maximum height position defined by the highest possible projecting end of the plunger 113 in the hydraulic jack 110 and the minimum height position defined by the lowest possible sinking end of the plunger 113 in the hydraulic jack 110.

Furthermore, the vehicle height can be instantaneously switched by adopting a solenoid valve as the selector valve 130 serving as the means for switching the vehicle height.

The vehicle height during the detection can be estimated by adopting the projecting height detection unit 151 for detecting the projecting height of the plunger 113 in the hydraulic jack 110, as the vehicle height detection unit 150.

Furthermore, the vehicle height during the detection can be estimated by adopting the hydraulic-pressure detection unit 152 for detecting the hydraulic pressure in the jack chamber 112 in the hydraulic jack 110 as the vehicle height detection unit 150. At this time, applying a filter (low pass) to the detection result from the hydraulic-pressure detection unit 152 enables the vehicle weight (loading capacity) to be estimated. When the vehicle weight is high and the vehicle height tends to decrease, the vehicle height is increased to prevent the damper 10L from being compressed to the limit. When the vehicle weight is low and the vehicle height tends to increase, the vehicle height is reduced to prevent the damper 10L from being stretched to the limit.

Furthermore, the vehicle height during the detection can be estimated by adopting the extension and compression stroke length detection unit 153 for detecting the extension or compression stroke length of the inner tube 12 with respect to the outer tube 11 as the vehicle height detection unit 150. At this time, applying a filter (band pass) to the detection result from the extension and compression stroke length detection unit 153 allows the recessed and protruding status (amplitude status) of the road surface to be estimated. When the road surface has a large amplitude, the vehicle height is increased to prevent the damper 10L from being compressed to the limit or is adjusted to an appropriate value to prevent the damper 10L both from being compressed to the limit and from being extended to the limit. When the road surface has a small amplitude, the vehicle height is reduced to relax wind resistance if the vehicle is of an on-road type and to prevent the vehicle body from pitching if the vehicle is of an off-road type.

(Configuration of the Damper 10R) (FIG. 1)

As shown in FIG. 1, the damper 10R includes a wheel-side outer tube 211 and a vehicle body-side inner tube 212 slidably inserted into the wheel-side outer tube 211. The damper 10R includes a damper cylinder 213 attached to a bottom portion of the outer tube 211 and installed upright inside the outer tube 211, a cap bolt 214 screwed in an upper end portion of the inner tube 212 and in which a spring load adjusting sleeve 215 is screwed, and a hollow piston rod 216 fixed to a lower end portion of the spring load adjusting sleeve 215. The piston rod 216 is inserted into an oil chamber 217 inside the damper cylinder 213 and includes a piston 218 at an insertion leading end thereof. The oil chamber 217 is partitioned into an upper oil chamber 217A and a lower oil chamber 217B by the piston 218. Between the outer tube 211 and the inner tube 212 in the damper 10R, an oil reservoir chamber 219 is formed of a space around an outer periphery of the damper cylinder 213, and an air chamber 220 is formed of an upper portion of the oil reservoir chamber 219.

The damper 10R includes a suspension spring 224 installed between a spring bearing 222 backed up by a spring collar 221 supported by the spring load adjusting sleeve 215 provided in the cap bolt 214 and a spring bearing 223 provided in an upper end portion of the damper cylinder 213.

The damper 10R includes a first damping force generator 231 in the piston 218. The first damping force generator 231 generates a compression-side damping force and an extension-side damping force. The damper 10R includes a second damping force generator 232 on a bottom portion side of the outer tube 211. The second damping force generator 232 generates a compression-side damping force and an extension-side damping force.

Thus, the damper 10R buffers an impact force applied by the road surface, by means of the spring force of the suspension spring 224 and the spring force of the air chamber 220. The compression- and extension-side damping forces generated by the first damping force generator 231 and the second damping force generator 232 damp stretching vibration involved in the absorption of the impact force by the suspension spring 224 and the air chamber 220.

The damper 10R includes a damping force adjusting rod 233 coaxially and relatively rotatably installed inside the spring load adjusting sleeve 215 provided in the cap bolt 214. The damping force adjusting rod 233 adjusts the damping force by using a leading-end needle inserted into a hollow portion of the piston rod 216 to throttle the channel area of a bypass channel that makes the oil chamber 217A and the oil chamber 217B located above and below the piston 218 in communication with each other while bypassing the piston 218.

Thus, the vehicle height control device 100 includes the suspension springs 33 and 224 in the left damper 10L and right damper 10R, respectively. In this case, according to the present embodiment, the spring load on the suspension spring 33 provided in one of the left and right dampers, that is, the damper 10L, is set higher than the spring load on the suspension spring 224 provided in the other of the left and right dampers, that is, the damper 10R.

The present embodiment exerts the following effects.

(a) The damper 10L has a configuration including "the wheel-side outer tube 11 and the vehicle body-side inner tube 12 slidably inserted into the wheel-side outer tube 11; the hollow pipe 22 installed upright in the inner bottom portion of the outer tube 11 and including the partition wall portion 22A that is in sliding contact with the inner periphery of the inner tube 12; the oil chamber 25 provided on the outer periphery of the hollow pipe 22 in such a manner that the piston 40 provided on the inner periphery of the leading end portion of the inner tube 12 advances into and retracts from the oil chamber 25, the oil chamber 25 being partitioned by the piston 40 into the upper oil chamber 25A above the piston 40 and the lower oil chamber 25B below the piston 40; and the oil reservoir chamber 27 defined by the inner periphery of the hollow pipe 22 and spanning to the upper portion of the inner tube 12, the upper portion of the oil reservoir chamber 27 forming the air chamber 28". In connection with the configuration, the vehicle height control unit 100L is provided which includes "the jack housing 111 of the hydraulic jack 110 provided at the upper end portion of the inner tube 12, such that the plunger 113 defining the jack chamber 112 of the hydraulic jack 110 is fitted on the jack housing 111 of the hydraulic jack 110 so as to be movable up and down; the suspension spring 33 provided between the upper end of the hollow pipe 22 and the plunger 113 of the hydraulic jack 110; and the pump housing 121 provided at the plunger 113 of the hydraulic jack 110 and forming the pump chamber 124 of the hydraulic pump 120, such that the pump pipe 123 installed upright at the upper end of the hollow pipe 22 and communicating with the oil reservoir chamber 27 on the inner periphery of the hollow pipe 22 is slidably inserted into the pump chamber 124 in the pump housing 121; and the selector valve 130 controlling the vehicle height by adjusting the amount of hydraulic oil fed to the jack chamber 112 in the hydraulic jack 110 by the hydraulic pump 120 that performs the pumping operation in conjunction with extending and contracting motion of the hollow pipe 22 with respect to the inner tube 12". Thus, the damper 10L provided with the vehicle height control unit 100L can be simply configured.

(b) The vehicle height control device has the detection unit 151 for detecting the height position of the plunger 113 of the hydraulic jack 110 and the ECU 140 that opens or closes the selector valve 130 in a controllable manner according to the result of the detection by the detection unit 151. Based on the result of the detection by the detection unit 151, the plunger 113 of the hydraulic jack 110 can be set to any height position, and thus the vehicle height can be adjusted to any height position.

(c) The selector valve 130 is provided at the upper end portion of the inner tube 12. The selector valve 130 formed of a solenoid or the like can be disposed at a sprung position above the suspension spring 33 where an input of vibration is small.

(d) The stoppage predicted time of the vehicle is predicted, and when the predicted stoppage predicted time is equal to or less than the predetermined reference stoppage time, the vehicle height reducing control mode is entered to switch the selector valve 130, thus enabling a vehicle height reducing operation. The vehicle height starts to be reduced during travel when the vehicle is about to stop. The vehicle height is completely reduced within a short time until the vehicle stops. This allows the rider's feet to appropriately touch the ground, thus ensuring stability.

(e) The vehicle height control unit 100L is provided only in the one of the left and right dampers, that is, the damper 10L. This enables a reduction in the occupied space, weight, and costs of the vehicle height control device 100.

(f) The suspension springs 33 and 224 are provided in the left and right dampers 10L and 10R, respectively, and the spring load on the suspension spring 33 provided in the one of the left and right dampers, that is, the damper 10L, is set higher than the spring load on the suspension spring 224 provided in the other of the left and right dampers, that is, the damper 10R. Thus, the suspension spring 33 in the damper 10L subjected to an increased load on spring bearings as a result of the provision of the vehicle height control unit 100L has an enhanced capability of supporting the damper 10L.

The spring load on the suspension spring 33 provided in the one of the left and right dampers, that is, the damper 10L, can be increased by setting a spring constant for the suspension spring 33 larger than a spring constant for the suspension spring 224 provided in the other of the left and right dampers, that is, the damper 10R.

Figure 12:
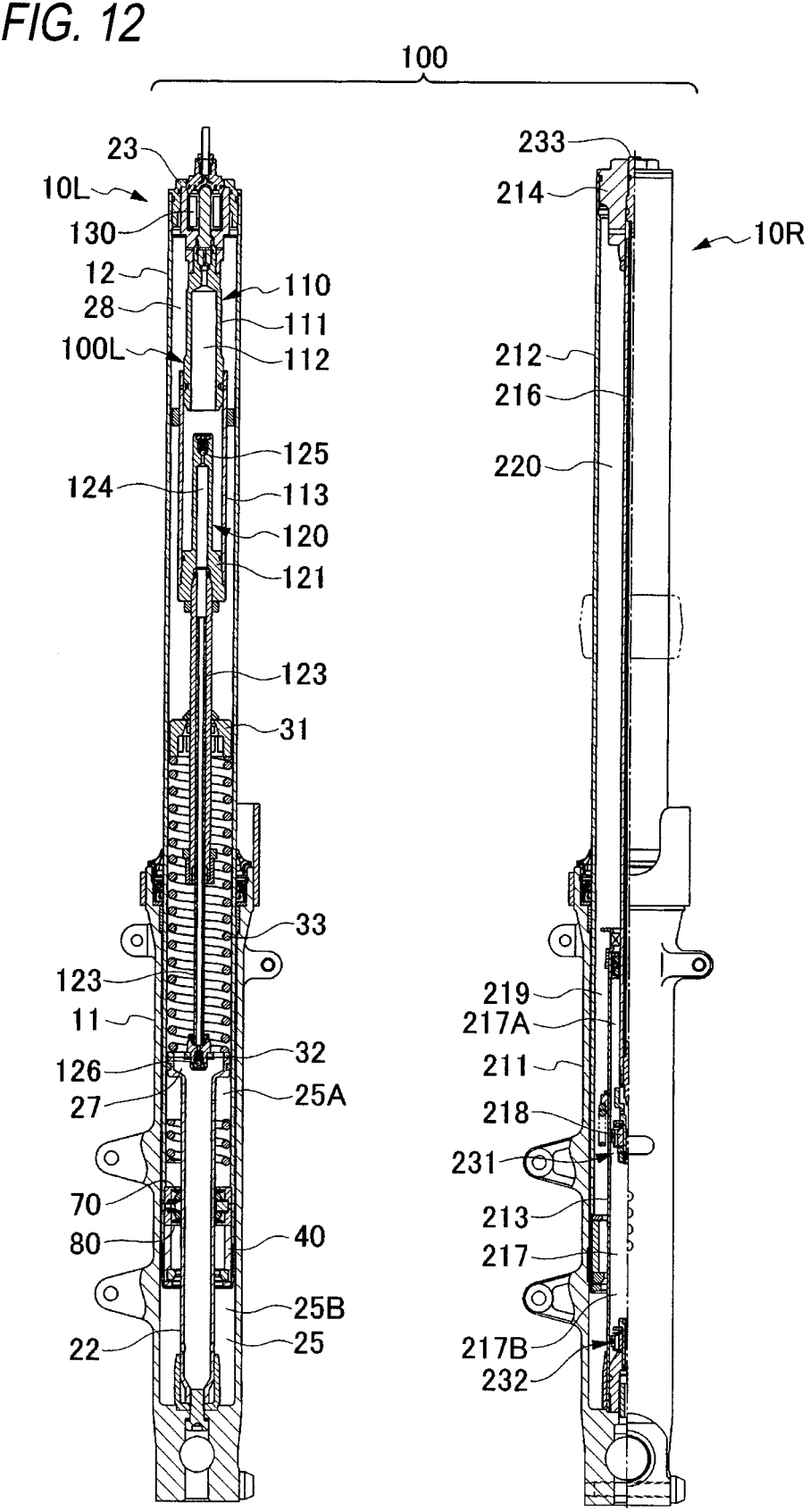
FIG. 12 is a cross-sectional view showing a left damper and a right damper included in another example of the vehicle height control device.

FIG. 12 shows the vehicle height control device 100 according to a variation of the embodiment shown in FIG. 1. In the left damper 10L and right damper 10R described above, the suspension spring 33 is provided only in one of the left and right dampers, that is, the damper 10L. The suspension spring 224 is removed from the other of the left and right dampers, that is, the damper 10R, and no suspension spring is provided in the damper 10R.

At this time, the amount by which the plunger 113 of the hydraulic jack 110 provided in the one of the left and right dampers, that is, the damper 10L, elevates and lowers is equivalent to double the amount by which the plunger 113 of the hydraulic jack 110 elevates and lowers assuming a case that a vehicle height control unit similar to the vehicle height control unit 100L is also provided in the damper 10R.

Thus, the vehicle height control device 100 exerts the following effects.

(a) The suspension spring 33 is provided only in the one of the left and right dampers, that is, the damper 10L. The suspension spring 224 is not provided in the other of the left and right dampers, that is, the damper 10R. Thus, the suspension spring 224 is not provided in the damper in which the vehicle height control unit 100L is not provided. This enables a reduction in the occupied space, weight, and costs of the vehicle height control device 100.

(b) The amount by which the hydraulic jack 110 provided in the one of the left and right dampers, that is, the damper 10L, elevates and lowers is equivalent to double the amount by which the hydraulic jack 110 elevates and lowers assuming a case that the vehicle height control units 100L are respectively provided in the left damper 10L and the right damper 10R. Thus, the spring load on the suspension spring 33 can be substantially doubled due to the deflection of the suspension spring 33 caused by the provision of the vehicle height control unit 100L and the suspension spring 33 only in the one of the dampers, that is, the damper 10L.

The embodiment of the present invention has been described in detail with reference to the drawings. However, the specific configuration of the present invention is not limited to the embodiment, but the present invention includes changes in design and the like made without departing from the spirits of the present invention. For example, in the vehicle height control device 100 with the vehicle height control unit 100L provided only in the one of the left and right dampers, that is, the damper 10L, the main damping force generator is provided in the other of the left and right dampers, that is, the damper 10R, and in the one of the left and right dampers, that is, the damper 10L, the damping force generator is not provided or only an auxiliary damping force generator is provided. Thus, the main damping force generator is provided in the damper 10R in which the vehicle height control unit 100L is not provided. In the damper 10L provided with the vehicle height control unit 100L, the damping force generator is not provided or only the auxiliary damping force generator is provided. Hence, the left and right dampers 10L and 10R can be balanced in weight.

Alternatively, according to the preset invention, the vehicle height control unit may be provided in both of the left and right dampers.

Furthermore, the present invention is similarly applicable to a lateral pair of dampers in a rear cushion.

The embodiment of the present invention provides a vehicle height control device for a motorcycle with a pair of dampers disposed on laterally opposite sides of a vehicle body, the vehicle height control device including a vehicle height control unit provided in at least one of the left and right dampers. The damper provided with the vehicle height control unit includes a wheel-side outer tube and a vehicle body-side inner tube slidably inserted into the wheel-side outer tube, a hollow pipe installed upright in an inner bottom portion of the outer tube and including a partition wall portion that is in sliding contact with an inner periphery of the inner tube, an oil chamber provided on an outer periphery of the hollow pipe in such a manner that a piston provided on an inner periphery of a leading end portion of the inner tube advances into and retracts from the oil chamber, the oil chamber being partitioned by the piston into an upper oil chamber above the piston and a lower oil chamber below the piston, an oil reservoir chamber defined by an inner periphery of the hollow pipe and spanning to an upper portion of the inner tube, the oil reservoir chamber having an upper portion that forms an air chamber, a jack housing of a hydraulic jack provided at an upper end portion of the inner tube such that a plunger defining a jack chamber of the hydraulic jack is fitted on the jack housing of the hydraulic jack so as to be movable up and down, a suspension spring provided between an upper end of the hollow pipe and the plunger of the hydraulic jack, and a pump housing provided at the plunger of the hydraulic jack and forming a pump chamber of a hydraulic pump such that a pump pipe installed upright at the upper end of the hollow pipe and communicating with the oil reservoir chamber on the inner periphery of the hollow pipe is slidably inserted into the pump chamber in the pump housing, and a selector valve controlling a vehicle height by adjusting an amount of hydraulic oil fed to the jack chamber in the hydraulic jack by the hydraulic pump that performs a pumping operation in conjunction with extending and contracting motion of the hollow pipe with respect to the inner tube. Thus, the damper provided with the vehicle height control unit can be simply configured.

What is claimed is:

1. A vehicle height control device for a motorcycle with a pair of dampers disposed on laterally opposite sides of a vehicle body, the vehicle height control device comprising:
   a vehicle height control unit provided in at least one of the left and right dampers,
   wherein the damper provided with the vehicle height control unit includes:
   a wheel-side outer tube;
   a vehicle body-side inner tube slidably inserted into the wheel-side outer tube;
   a hollow pipe installed upright in an inner bottom portion of the outer tube and including a partition wall portion that is in sliding contact with an inner periphery of the inner tube;
   a piston provided on an inner periphery of a leading end portion of the inner tube;
   an oil chamber provided on an outer periphery of the hollow pipe in such a manner that the piston advances into and retracts from the oil chamber, the oil chamber being partitioned by the piston into an upper oil chamber above the piston and a lower oil chamber below the piston; and
   an oil reservoir chamber defined by an inner periphery of the hollow pipe and spanning to an upper portion of the inner tube, the oil reservoir chamber having an upper portion that forms an air chamber, and
   wherein the vehicle height control unit includes:
   a hydraulic jack including a jack housing and a plunger, the jack housing being provided at an upper end portion of the inner tube such that the plunger defining a jack chamber of the hydraulic jack is fitted on the jack housing so as to be movable up and down;
   a suspension spring provided between an upper end of the hollow pipe and the plunger of the hydraulic jack;
   a hydraulic pump including a pump housing and a pump pipe, the pump housing being provided at the plunger of the hydraulic jack and forming a pump chamber of the hydraulic pump such that the pump pipe installed upright at the upper end of the hollow pipe and communicating with the oil reservoir chamber on the inner periphery of the hollow pipe is slidably inserted into the pump chamber in the pump housing; and
   a selector valve controlling a vehicle height by adjusting an amount of hydraulic oil fed to the jack chamber in the hydraulic jack by the hydraulic pump that performs a pumping operation in conjunction with extending and contracting motion of the hollow pipe with respect to the inner tube.

2. The vehicle height control device for the motorcycle according to claim 1, further comprising:
   a detection unit that detects a height position of the plunger of the hydraulic jack; and
   a control unit that opens or closes the selector valve in a controllable manner according to a result of the detection by the detection unit.

3. The vehicle height control device for the motorcycle according to claim 1,
   wherein the selector valve is provided at the upper end portion of the inner tube.

4. The vehicle height control device for the motorcycle according to claim 2,
   wherein the selector valve is provided at the upper end portion of the inner tube.

5. The vehicle height control device for the motorcycle according to claim 2,
wherein the control unit predicts a stoppage predicted time of a vehicle, and when the predicted stoppage predicted time is equal to or less than a reference stoppage time, and
the control unit enters a vehicle height reducing control mode to switch the selector valve, which enables a vehicle height reducing operation.

6. The vehicle height control device for the motorcycle according to claim 1,
wherein the vehicle height control unit is provided only in one of the left and right dampers.

7. The vehicle height control device for the motorcycle according to claim 6,
wherein a suspension spring is provided in the other of the left and right the dampers, and a spring load on the suspension spring provided in the one of the left and right dampers is set higher than a spring load on the suspension spring provided in the other of the left and right dampers.

8. The vehicle height control device for the motorcycle according to claim 6,
wherein a suspension spring is not provided in the other of the left and right dampers.

9. The vehicle height control device for the motorcycle according to claim 8,
wherein an amount by which the hydraulic jack provided in the one of the left and right dampers elevates and lowers is equivalent to double an amount by which the hydraulic jack elevates and lowers assuming a case that vehicle height control units are respectively provided in both the left and right dampers.

10. The vehicle height control device for the motorcycle according to claim 6,
wherein a main damping force generator is provided in the other of the left and right dampers, and
in the one of the left and right dampers, the damping force generator is not provided or only an auxiliary damping force generator is provided.

* * * * *